Patented Nov. 8, 1949

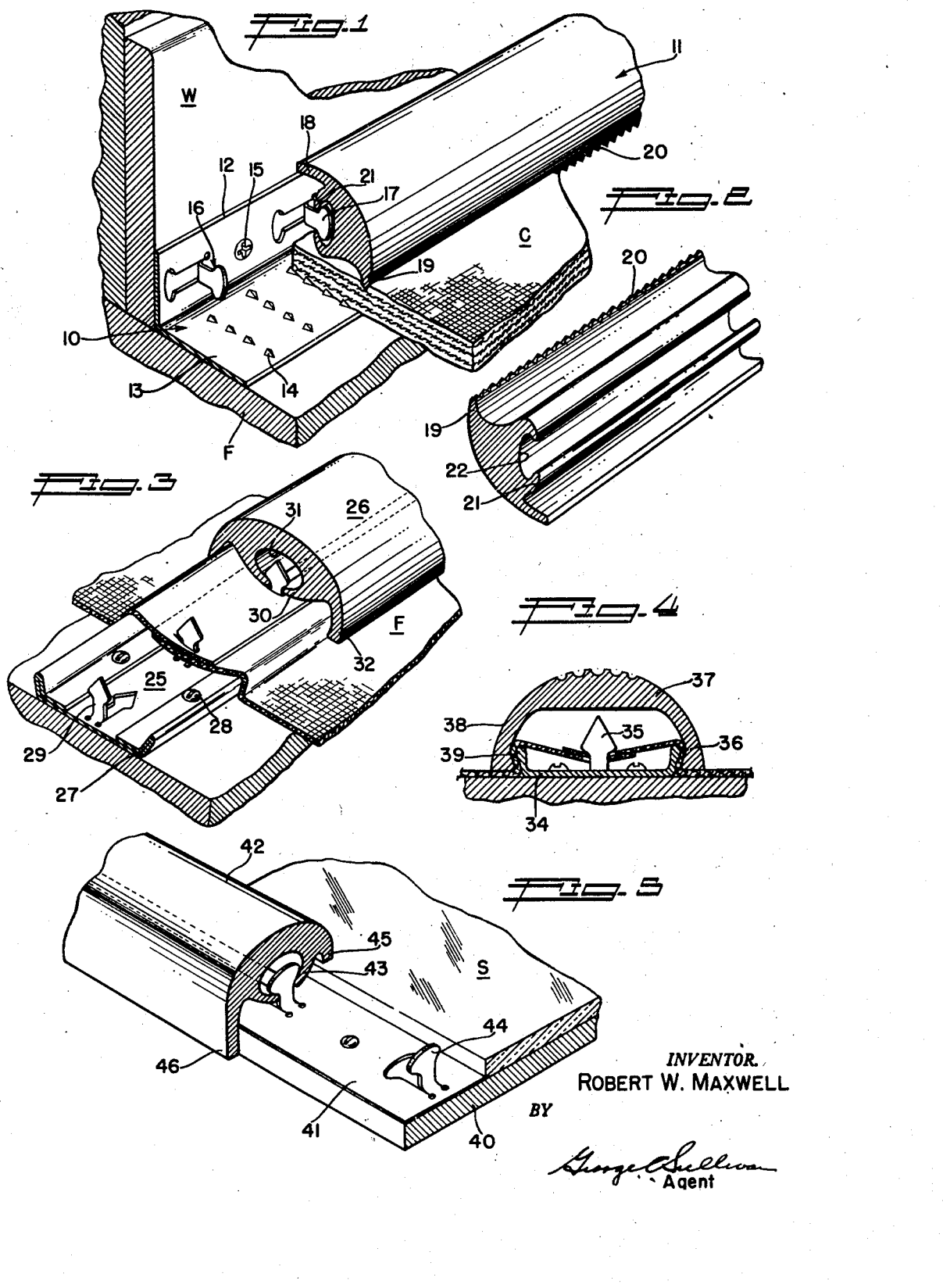

2,487,571

UNITED STATES PATENT OFFICE 2,487,571

COMBINED FASTENER AND STRETCHER FOR CARPETING AND THE LIKE

Robert W. Maxwell, Los Angeles, Calif., assignor to Lockheed Aircraft Corporation, Burbank, Calif.

Application August 1, 1945, Serial No. 608,173

10 Claims. (Cl. 16—5)

This invention relates to mouldings and decorative trim strips for use in association with floor and wall coverings, upholstery, trim fabric for vehicles, etc. A general object of the invention is to provide moulding or trim strips of this character that are readily installed, and which promote economy in the fabrication and installation of the structure with which they are associated.

In situations where carpeting, wallboard, plastic wall coverings, fabric trim, and the like are installed, there is difficulty in securing the material so as to lie flat against the supporting surface, and considerable care must be exercised to obtain attractive joints and terminal edges. The services of skilled and experienced workmen are required for the installation, and the operations are often time-consuming. These factors add materially to the cost of the installation and product. Furthermore, the conventional modes of securing carpeting, fabric trim, wall coverings and like materials, render it difficult to remove the material without injuring the material and without damaging the mouldings and supporting structure.

It is another object of this invention to provide attractive ornamental means for securing trim and covering materials to floors, walls, furniture, vehicles, etc., that does not require the services of skilled workmen and that facilitates the rapid installation and attachment of the material. In the case of wall coverings, such as wallboard, plywood, plastic sheets, etc., the devices conceal the raw edges and corners, and maintain an inward pressure to hold the material against the wall.

A further object of the invention is to provide a trim strip or moulding device for use with fabric wall coverings, and the like, which not only anchors the fabric at a multiplicity of points along its edges, but also has a "snubbing" effect to maintain the tension or tautness in the fabric. This snubbing of the fabric is continuous and uniform throughout the length of the trim strip.

A still further object of the invention is to provide an attaching means of the character above referred to that is simple and inexpensive to manufacture, embodying a minimum number of parts adapted to be produced in any desired stock lengths for cutting to size at the time of installation.

Other objectives and features of the invention will be readily understood from the following detailed description of typical preferred forms of the invention wherein references will be made to the accompanying drawings in which:

Figure 1 is a perspective view of one embodiment of the invention employed to secure the edge of carpeting, with the several parts appearing in vertical cross section;

Figure 2 is a perspective view illustrating the internal surface of the moulding strip illustrated in Figure 1;

Figure 3 is a fragmentary perspective view of another form of the invention employed to secure trim fabric, with the several parts broken away to appear in vertical cross section;

Figure 4 is a vertical detailed sectional view of a slightly modified form of trim fabric attaching means; and Figure 5 is a perspective view of the attaching device of the invention as employed to secure glass panels, and the like.

Figures 1 and 2 of the drawings illustrate the invention embodied in a device useful in securing the edge portions of carpeting and fabric wall trim along the line of joinder of a floor and wall, of a wall and a ceiling, or of two contiguous walls. The device of Figures 1 and 2 comprises two major elements, namely, an attaching strip 10 and a cap strip or moulding strip 11.

The attaching strip 10 is an elongate member of sheet metal of suitable gauge initially fabricated in any selected length. Where weight is an important consideration, the strip 10 may be formed of aluminum alloy sheet stock. It is to be understood that the strip 10 is sufficiently flexible to readily conform to the structure to which it is applied. The strip 10 is angular or substantially L-shaped in transverse cross section having two flanges 12 and 13. In the particular application of the invention illustrated in Figure 1, the trim device is employed to secure the edge portion of carpeting C to a floor F. In this case, the flange 12 is substantially vertical and is engaged against a wall W while the flange 13 is substantially horizontal to bear on the floor F. Either one or both of the flanges 12 and 13 may be secured to the supporting structure. In the arrangement illustrated, one or more screws 15 are passed through openings in the vertical flange 12 to secure the attaching strip to the wall W. The horizontal flange 13 may be of substantial width, and in a typical application, is considerably wider than the flange 12.

The horizontal flange 13 extends under the floor covering or carpeting C, and in accordance with the invention, is provided with means for anchoring or retaining the carpeting. This means preferably takes the form of teeth or barbs 14 projecting from the exposed surface of the flange.

The barbs 14 are shown in longitudinally spaced transversely extending rows, it being understood that they may be arranged in other manners to be spaced along the length and breadth of the flange 13. It is preferred to construct the barbs 14 to project upwardly and to slope toward the flange 12, and to terminate in sharp points. With this configuration, the barbs 14 effectively prevent or resist movement of the carpeting C away from the wall W. The barbs 14 are preferably integral with the flange 13, and may be formed by piercing the flange and bending back the flange metal.

The vertical flange 12 is provided with means for removably latching with and retaining the trim strip 11. This means comprises tongues or lugs 16 projecting forwardly from the face of the flange. The lugs 16 are preferably integral parts of the flange 12, and may be formed by a simple piercing and stamping operation. Spaced openings may be pierced in the flange 12 and the metal outlined by the openings bent outwardly to constitute lugs. The lugs 16 are substantially T-shaped, having straight shanks terminating in heads 17 of increased width. It is preferred to provide the lugs 16 at equally spaced intervals throughout the length of the flange 12 and to arrange the lugs in a longitudinal row spaced between the upper and lower edges of the flange. The lugs 16 project at right angles from the face of the flange 12, and their longitudinal axes are preferably substantially parallel with the floor F. The outer extremities of the T-shaped lugs 16 are rounded or convex for the ready attachment of the trim strip 11.

The moulding strip or trim strip 11 is preferably a simple continuous one-piece member, and in accordance with the invention, it may be a metal or plastic extrusion, a stamped metal part, or the like. When formed of a plastic, the strip 11 may be of any selected color and finish, and in the event it is constructed of metal, it may be plated or painted. From the exterior, the strip 11 resembles a quarter round moulding having a curved convex external surface. The trim strip 11 is proportioned to overlie and conceal the attaching strip 10, and the edge portion of the floor covering C. In the preferred construction, the strip 11 is shaped to have a continuous upper wing or lip 18 which laps over the upper edge of the flange 12, and a lower lip 19 which cooperates with the carpeting C. The lower lip 19 is shaped to have effective tensioning and retaining engagement with the carpeting. As best illustrated in Figure 2, the lower edge of the lip 19 has a continuous series of serrations 20. The serrations 20 may be V-shaped and are of sufficient length to penetrate the nap or surface of the carpeting C and engage in the body of the carpeting. If desired, the teeth 20 may slope rearwardly or toward the wall W to obtain a better grip on the carpeting C.

The moulding or trim strip 11 is constructed to have snap-on locking engagement with the lugs 16 of the attaching strip 10. The inner side of the strip 11 has two longitudinally extending ribs 21 which define a channel 22 for receiving the lugs 16. The ribs 21 curve toward one another so that the channel 22 has a restricted mouth or entrance. The ribs are relatively thin to have substantial flexibility, and the lip 18 which carries the upper rib 21, also has considerable flexibility. This allows the ribs 21 to be snapped onto the lugs 16 so that the lug heads 17 are locked in the channel 22.

In employing the device of Figures 1 and 2, the attaching strip 10 is secured to the wall and floor by the screws 15 or other appropriate attaching means. When the carpeting C is laid in the usual manner it is arranged to overlie a substantial portion of the flange 13. With the carpeting C cut and laid, the trim strip 11 is engaged on the upper face of the carpeting C and is moved toward the wall W. The strip 11 is pressed forwardly so that the channel ribs 21 are snapped over the lugs 16. In performing this operation the strip 11 is pressed downwardly as it is moved forwardly so that the serrations 20 bite into the carpeting C and draw it taut. The serrations 20 draw the carpeting toward the wall W and the downward and forward pressure exerted on the strip 11 forces the carpeting onto the barbs 14 so that the barbs penetrate the lower face of the carpeting. The engagement of the lugs 16 in the channel 22 imposes a spreading force on the lips 21 causing the teeth 20 to further penetrate the carpeting C. Thus it will be seen that the carpeting is tightened and securely retained along its edge simultaneously with the snap-on engagement of the strip 11 with the lugs 16 of the attaching strip. The lugs 16 and the ribs 21 are proportioned and related so that the trim strip 11 is securely retained in place so that the carpeting C is dependably gripped between the barbs 14 and the serrations 20 to be positively held against displacement. When it becomes necessary to remove the carpeting C for cleaning or replacement, the trim strip 11 is engaged adjacent one of its ends, and is drawn outwardly to disengage the channel ribs 21 from the lugs 16. When the trim strip 11 has been disengaged from the several lugs 16, the carpeting C is free for removal. The trim strip 11 may be re-installed when the carpeting is re-laid. The attaching strip 10 is in the nature of a permanent installation and the trim strip is capable of repeated re-use.

Figure 3 of the drawings illustrates the invention embodied in a device for attaching or securing trim fabric to a wall, or the like. This device comprises an attaching strip 25 and a trim strip 26. The attaching strip 25 is an elongate part of sheet metal, or the like, adapted to be secured to the underlying or supporting structure. The strip 25 has a flat base portion for engaging the structure and upturned edge flanges 27. It is preferred to construct the strip of sheet metal and to turn back the edge portions of the stock so that the flanges 27 and the adjacent portions of the base have a double thickness. The flanges 27 are sloping or in outwardly divergent relation. The attaching strip 25 is preferably of uniform width and configuration throughout its length. Any appropriate means may be employed to secure the strip 25 to the underlying structure. In the case illustrated, suitable screws 28 are employed for this purpose. The strip 25 is provided with a row of spaced lugs 29 similar to the above described lugs 16. The lugs 29 are spaced throughout the length of the strips 25 and are generally T-shaped. The outer ends of the lugs 29 are shaped to form entering points for more readily penetrating the fabric trim F.

The trim fabric F is arranged over the supporting structure in the usual manner and is engaged across the attaching strip 25. In the drawings I have shown two lengths or sections of the fabric F, having edge portions overlapping at the strip 25. Each section of the fabric F is drawn taut in both the longitudinal and transverse directions, and is then engaged on the lugs 29. In the case of relatively thin and readily penetrated material, the fabric is merely forced onto the pointed lugs so that the lugs cut through the fabric. However, where the fabric is heavier it may be necessary to cut slits for the reception of the lugs 29. The lugs thus engaged through the fabric F securely anchor it to the attaching strip and preserve the initial tension. It is preferred to cut the fabric F so that its lapped edges overlie the attaching strip to be concealed by the trim strip.

The trim strip 26 is snapped onto the attaching strip 25 to conceal the lapped edges of the fabric F, to further tension the fabric and to positively prevent its disengagement from the lugs 29. The strip 26 may be a metal or plastic extrusion or a formed sheet metal part, and is an elongate continuous member cut to the required length. The trim strip 26 may be formed to present an exterior of any selected configuration. It is preferred to shape the strip 26 to entirely engage over and conceal the attaching strip 25, and the trim strip is formed to have latching cooperation with the lugs 29. Two spaced longitudinally extending ribs 30 are provided on the under side of the strip 26 and curve toward one another to define a channel 31 having a restricted downwardly facing entrance. The ribs 30 and the walls of the strip 26 have considerable flexibility to allow the ribs 30 to snap over the lugs 29 when the strip is forced onto the lugs. The heads of the pointed V-shaped lugs 29 latch in the channel 31 to effectively hold the strip 26 against displacement.

The trim strip 26 is constructed to have longitudinal edge flanges 32 for cooperating with the flanges 27 of the attaching strip 25. The flanges 32 have substantial lateral flexibility, and their inner surfaces may be in donwward convergent relation. After the fabric F has been tensioned and anchored on the lugs 29, as above described, there are portions of the fabric extending from the crests of the flanges 27 to the supporting surface in a sloping manner to form diaphragms which are spaced from the supporting surface. When the trim strip 26 is forced onto the attaching strip 25 to have the snap-on locking engagement with the lugs 29, the flanges 32 engage these free or diaphragm portions of the fabric F and force them downwardly to lie flush against the supporting under surface. Thus, simultaneously with the snap-on engagement of the trim strip 26 with the lugs 29, the flanges 32 impose a final tensioning or tautening force on the fabric F to draw it tight. As above described, the inner sides of the flanges 32 may be slightly convergent, and this configuration causes the flanges to latch under the sloping flanges 27 of the attaching strip to aid the lugs 29 and ribs 30 in securing the trim strip to the attaching strip. As in the previously described form of the invention, the attaching strip 25 may be a permanently installed member, and the trim strip 26 may be readily removed to permit cleaning and replacement of the fabric F. The trim strip 26 is capable of repeated re-use.

Figure 4 illustrates a modification of the device shown in Figure 3. In Figure 4 the attaching strip 34 is substantially the same as the strip 25, having longitudinally spaced outwardly projecting pointed T-shaped lugs 35 and outwardly divergent longitudinal edge flanges 36. I have shown the strip 34 in the form of an extrusion. The trim or moulding strip 37 is substantially the same as the strip 26 above described, but in this construction the channel forming ribs are omitted, and the longitudinal edge flanges 38 serve to tension the fabric F and to secure the trim strip to the attaching strip 34. The inner sides of the flanges 38 have pronounced downwardly and inwardly convergent surfaces 39. These surfaces 39 mate or cooperate with the outer faces of the sloping flanges 36. When the fabric F has been tensioned and engaged on the lugs 35, the trim strip 37 is arranged in place and pressed downwardly to cause the flanges 38 to snap over the flanges 36. The engagement of the flanges 38 with the sloping diaphragm portions of the fabric F imparts a final tension to the fabric, and the cooperation of the surfaces 39 with the fabric pressed against the flanges 36 latches the trim strip 37 on the attaching strip.

It is to be observed that the devices of Figures 3 and 4 not only secure and conceal the edge portions of the fabric F, but also serve to finally tension the fabric. The fabric engaged between the flanges 27 and 32 or 36 and 38 is "snubbed" and securely clamped or held along the continuous or uninterrupted flanges. This holds the fabric taut and smooth throughout the length of the securing device.

In Figure 5 I have illustrated the invention employed to secure a section or sheet of glass, or the like, to a supporting member. This form of the invention is useful on picture frames, mirrors, cabinets, wall panels, and in similar situations where it is desired to removably retain a sheet or panel of glass or like material. In the drawings, 40 may be considered a supporting or backing member such as the body element of a picture frame. A sheet S of glass, plastic or similar material is arranged against one face of the backing 40. The device of Figure 4 includes an attaching strip 41 and a mould strip 42. The attaching strip 41 may be a simple, flat length of sheet metal provided with a row of spaced T-shaped lugs 44 similar to the above described lugs 16. The strip 41 is secured to the face of the backing 40 along its edge by screws or similar attaching means.

The moulding strip 42 is similar to the above described strip 11 being provided at its under side with spaced longitudinally extending ribs 43 defining a channel for the reception of the heads of the T lugs 44. The strip 42 has two longitudinal edge flanges 45 and 46. The flange 45 presents a flat lower edge for engaging the face of the sheet S. The parts are formed and related so that when the heads of the lugs 44 are latched in the ribs 43, the flange 45 bears inwardly against the sheet S with considerable force. Thus the moulding strip 42 serves to hold the sheet in firm contact with its backing. The flange 46 may be designed to cooperate with the face of the backing 40. However, in the case illustrated the flange 46 is extended to lap over and conceal the edge of the backing. It will be seen that when the strip 42 is forced or snapped onto the lugs 44 it serves to secure the sheet S in place and serves as an ornamental moulding for concealing the edges of the sheet S and backing 40.

Having described only typical forms of the invention, I do not wish to be limited to the specific details herein set forth, but wish to reserve to myself any variations or modifications that may fall within the scope of the following claims.

I claim:

1. Means for attaching material to a support comprising an attaching strip to be secured to the support, a trim strip, cooperable parts on the strips for latching the trim strip to the attaching strip when the trim strip is moved toward the attaching strip to be pressed onto the attaching strip, and means for drawing the material toward the attaching strip and for forcing the material against the support when the trim strip is pressed onto the attaching strip by said movement comprising an edge flange on the trim strip spaced away from said cooperable parts and presenting a surface facing in a direction perpendicular to the direction of said movement of the trim strip for engaging the material.

2. Means for attaching material to a support comprising an attaching strip to be secured to the support, a trim strip, cooperable parts on the strips for latching the trim strip to the attaching strip when the trim strip is pressed onto the attaching strip, and means for drawing the material toward the attaching strip and for forcing the material against the support when the trim strip is pressed onto the attaching strip comprising serrations projecting from the trim strip in a direction perpendicular to the plane occupied by the material for contacting the material as the trim strip is pressed on the attaching strip.

3. Means for securing the edge portion of material to one of two angularly related surfaces comprising an attaching strip to be secured to said surfaces, a moulding strip for concealing the attaching strip and the edge portion of the material, cooperable parts on the strips for latching the moulding strip to the attaching strip when the moulding strip is pressed toward the other of said surfaces onto the attaching strip, and a longitudinally extending edge portion on the moulding strip facing toward the surface to which said material is to be secured and roughened to bite into the material to urge it toward the line of joinder of said surfaces when the moulding strip is pressed onto the attaching strip.

4. Means for securing the edge portion of material to one of two angularly related surfaces comprising an attaching strip to be secured to said surfaces, a moulding strip for concealing the attaching strip and the edge portion of the material, cooperable parts on the strips for latching the moulding strip to the attaching strip when the moulding strip is pressed onto the attaching strip in a direction toward the other of said surfaces, and means for securing the material comprising teeth on at least one of the strips facing in a direction perpendicular to the first named direction for engaging in the material when the moulding strip is pressed onto the attaching strip.

5. Means for securing the edge portion of material to one of two angularly related surfaces comprising an attaching strip to be secured to said surfaces and including a first flange to lie against the surface to which the material is to be secured and a second flange to lie against the other surface, a moulding strip for concealing the attaching strip and the edge portion of the material, cooperable parts on said second flange and the moulding strip for latching the moulding strip to the attaching strip when the moulding strip is pressed toward said second flange, and opposing toothed parts on the moulding strip and said first flange for securing the material therebetween when the moulding strip is pressed toward the second flange.

6. Means for securing the edge portion of material to one of two angularly related surfaces comprising an attaching strip to be secured to said surfaces, a moulding strip for concealing the attaching strip and the edge portion of the material, cooperable parts on the strips for latching the moulding strip to the attaching strip when the moulding strip is pressed onto the attaching strip, longitudinal flanges on the strips spaced away from said cooperable parts for contacting opposite sides of the material, and teeth on at least one of said flanges for entering said material when the moulding strip is pressed onto the attaching strip.

7. Means for securing the edge portion of material to one of two angularly related surfaces comprising an attaching strip to be secured to said surfaces, a moulding strip for concealing the attaching strip and the edge portion of the material cooperable snap fastener parts on the strip for latching the moulding strip to the attaching strip when the moulding strip is pressed onto the attaching strip, flanges on the strips for engaging opposite surfaces of the material, and barbs on the flange of the attaching strip spaced from said snap fastener parts for acting on one surface of the material.

8. Means for securing the edge portion of material to one of two angularly related surfaces comprising an attaching strip to be secured to said surfaces, a moulding strip for concealing the attaching strip and the edge portion of the material, cooperable parts on the strips for latching the moulding strip to the attaching strip when the moulding strip is pressed onto the attaching strip, a flange on the attaching strip in a direction parallel with the plane of said material lying against the surface on which the material is engaged, said flange extending beneath the material, barbs on said flange projecting outwardly toward the material and toward the other surface and adapted to engage one face of the material, and serrations on the moulding strip projecting therefrom in a direction perpendicular to said plane for engaging the other face of the material.

9. Means for securing the edge portion of material to one of two angularly related surfaces comprising an elongate attaching strip having a first flange lying against one of said surfaces and a second flange lying against the other of said surfaces to extend under said material, longitudinally spaced lugs projecting outwardly from the first flange and having enlarged heads on their outer ends, a moulding strip for concealing the attaching strip and the edge portion of the material, a pair of flexible longitudinally extending lips on the inner side of the moulding strip spaced one from the other to leave a channel for the reception of said lugs, the flexible lips being curved inwardly and toward one another to snap over said heads and conform generally thereto upon movement of the moulding strip toward the first flange, the lips being cooperable with the lugs to removably secure the moulding strip to the attaching strip, the moulding strip having a longitudinal edge part facing toward said second flange, and serrations on said edge part for engaging the material to urge the same toward the first flange when the moulding strip is moved toward the first flange to snap said lugs and lips into engagement.

10. Means for securing the edge portion of material to one of two angularly related surfaces comprising an elongate attaching strip having a first flange lying against one of said surfaces and a second flange lying against the other of said surfaces to extend under said material, longitudinally spaced lugs projecting outwardly from the first flange and having enlarged heads on their outer ends, a moulding strip for concealing the attaching strip and the edge portion of the material, a pair of flexible longitudinally extending lips on the inner side of the moulding strip spaced one from the other to leave a channel for the reception of said lugs, the flexible lips being curved inwardly and toward one another to snap over said heads and conform generally thereto upon movement of the moulding strip toward the first flange, the lips being cooperable with the lugs to removably secure the moulding strip to the attaching strip, the moulding strip having a longitudinal edge part facing toward said second flange, barbs on said second flange facing upwardly and toward the first flange and engageable by the underside of the material to resist movement of the material away from the first flange, and teeth projecting downwardly from the lower edge of the moulding strip for digging into the upper side of the material to urge the material downwardly and toward the first flange when the moulding strip is moved toward the first flange to snap said lugs and lips into engagement.

ROBERT W. MAXWELL.

REFERENCES CITED

The following references are of record in the file of this patent:

UNITED STATES PATENTS

| Number | Name | Date |
| --- | --- | --- |
| 205,425 | Sallada | June 25, 1878 |
| 397,598 | McCleary | Feb. 12, 1889 |
| 1,071,659 | Wright | Aug. 26, 1913 |
| 1,208,496 | Cooke | Dec. 12, 1916 |
| 1,576,527 | McBride | Mar. 16, 1926 |
| 1,685,362 | Joseph | Sept. 25, 1928 |